US008312463B2

(12) United States Patent
Smith et al.

(10) Patent No.: US 8,312,463 B2
(45) Date of Patent: Nov. 13, 2012

(54) RESOURCE MANAGEMENT IN COMPUTING SCENARIOS

(75) Inventors: Burton J. Smith, Seattle, WA (US);
David Probert, Woodinville, WA (US);
Abhishek Singh, Redmond, WA (US);
Douglas Burger, Redmond, WA (US);
David Wecker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 12/750,500

(22) Filed: Mar. 30, 2010

(65) Prior Publication Data

US 2011/0247001 A1    Oct. 6, 2011

(51) Int. Cl.
*G06F 9/46* (2006.01)

(52) U.S. Cl. ....................................... 718/104

(58) Field of Classification Search ........................ None
See application file for complete search history.

(56) References Cited

U.S. PATENT DOCUMENTS

| | | | |
|---|---|---|---|
| 7,564,820 B2 | 7/2009 | Subramanian et al. |
| 7,584,111 B2 | 9/2009 | Jain |
| 7,613,848 B2 | 11/2009 | Amini et al. |
| 2007/0268816 A1 | 11/2007 | Hosein |

OTHER PUBLICATIONS

Lee, et al., "On Quality of Service Optimization with Discrete QoS Options", Retrieved at << http://www.cs.cmu.edu/~clee/rtas99.pdf>>, RTAS, Proceedings of the Fifth IEEE Real-Time Technology and Applications Symposium, Jun. 2-4, 1999, pp. 11.
Heo, et al., "OptiTuner: An Automatic Distributed Performance Optimization Service and a Server Farm Application", Retrieved at << http://controlofsystems.org/febid2009/papers/p6_s23_HoeJayachandranAbdelzaher.pdf>>, Fourth International Workshop on Feedback Control Implementation and Design in Computing Systems and Networks (FeBID), Apr. 16, 2009, pp. 8.
Zhu, et al., "Utility-Driven Workload Management using Nested Control Design", Retrieved at << http://www.hpl.hp.com/techreports/2005/HPL-2005-193R1.pdf>>, Mar. 29, 2006, pp. 9.
Lindberg, Mikael., "Constrained Online Resource Control Using Convex Programming based Allocation", Retrieved at << http://controlofsystems.org/febid2009/papers/p5_s22_Lindberg.pdf>>, In Proceedings of Fourth International Workshop on Feedback Control Implementation and Design in Computer Systems & Networks (FeBID), Apr. 16, 2009, pp. 7.

*Primary Examiner* — Emerson Puente
*Assistant Examiner* — Gregory Kessler (57) ABSTRACT

This patent application pertains to urgency-based resource management in computing scenarios. One implementation can identify processes competing for resources on a system. The implementation can evaluate an urgency of individual competing processes. The implementation can also objectively allocate the resources among the competing processes in a manner that reduces a total of the urgencies of the competing processes.

20 Claims, 6 Drawing Sheets

RESOURCE MANAGEMENT IN COMPUTING SCENARIOS

BACKGROUND

The present discussion relates to resource management in computing scenarios such as operating systems and hypervisors. Historically, resource management solutions have been rather unsystematic. For instance, urgency has been described by a single value (usually called a "priority") associated with a thread of computation and adjusted within the operating system by a variety of ad-hoc mechanisms. Other resources, such as input/output (I/O) or network bandwidth, have been deemed so abundant as to require no management at all. The assumptions underlying existing resource management strategies of this sort no longer hold.

SUMMARY

This patent application pertains to urgency-based resource management in computing scenarios. One implementation can identify processes competing for resources on a system. The implementation can evaluate an urgency of individual competing processes. The implementation can also objectively allocate the resources among the competing processes in a manner that reduces a total of the urgencies of the competing processes.

The above listed example is provided for introductory purposes and does not include all of and/or limit the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application pertains to resource management in computing scenarios, and more specifically to urgency-based resource management. "Resource management" as the term is used herein can mean the dynamic allocation and de-allocation of processor cores, memory pages, and various categories of bandwidth, among others, to agents that compete for those resources. Urgency-based resource management can allocate resources according to an objective function, such as a total of the urgency functions, which in turn depend on the responsiveness of each competing agent. For instance, in a scenario with multiple processes competing for resources, an urgency function can be assigned to each process. Resources can be allocated in a manner that satisfies the multiple processes considered as a whole (e.g. reducing and potentially minimizing a total of the urgencies). The total can be manifest as the sum, the maximum, or some other characterization of the urgencies.

Viewed from one perspective, the term urgency can reflect the value of a process to a user. Note, in this document the term "urgency" will be used interchangeably with the term "metric of responsiveness". In some cases, the urgency can depend on both the application being run and on that application's current state (e.g., has focus, is minimized, etc.). Considered from another perspective, urgency can be viewed as a function of latency. Thus, urgency is a function rather than a mere number, like priority. Accordingly, urgency is not analogous to priority and the use of urgency in resource allocation can produce greater user satisfaction than utilizing priority. Briefly, "latency" can be defined as time/work-unit. Latency is discussed in more detail below under the heading "Latency Functions".

Considered from another perspective, resource management can address "processes". A process can be thought of as anything to which resources are allocated. Thus, urgency-based resource management can employ an urgency function for each process. Overall satisfaction can be determined by considering a total of the urgency functions. Accordingly, some implementations can try to reduce and/or minimize overall urgency. User satisfaction with a computing experience tends to be inversely proportional to the overall urgency. For instance, if the user clicks a command key, the user expects a relatively quick response. In such a scenario a delayed response tends to decrease user satisfaction. To reduce and/or minimize overall urgency, some of the present implementations can treat resource allocation as a convex optimization problem. Thus, incremental optimization can be applied to each of the processes competing for the available resources. These concepts are described in detail below under the heading "Mathematical Examples".

To summarize, the present implementations can allocate resources to competing processes in an urgency-based manner that addresses total urgency across a system, maintains resource constraints and/or reacts to changes in workload and/or user desires. Toward this end, urgency (e.g. optimizing total urgency) can be addressed as a convex optimization problem for allocating the resources among the competing processes.

Urgency-Based Resource Management Examples

Figure 1:
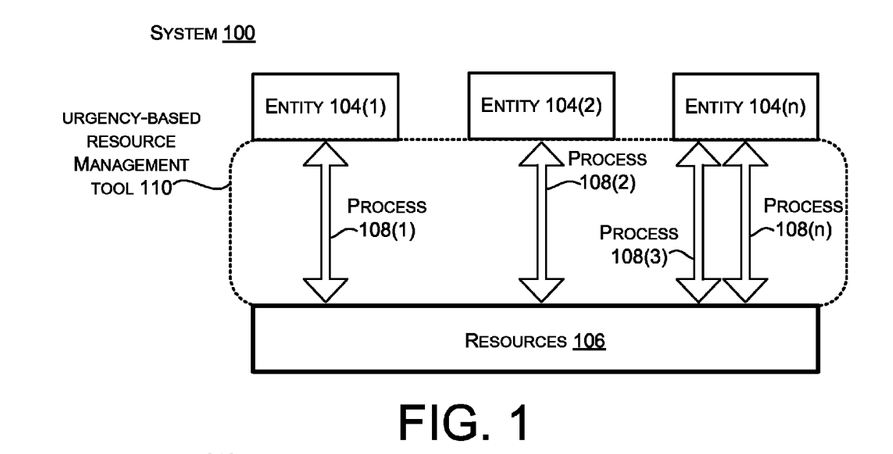
FIGS. 1 and 6 show urgency-based resource management systems in accordance with some implementations of the concepts.

FIG. 1 shows a system 100 that can involve urgency-based resource management. System 100 involves entities 104(1), 104(2), and 104(n), such as applications. Individual entities 104(1)-104(n) can utilize resources 106 via respective processes 108(1), 108(2), 108(3), and 108(n). An urgency-based resource management tool 110 can allocate resources 106 to the individual processes 108(1), 108(2), 108(3), 108(n) in a manner that satisfies overall satisfaction. Examples of resources can include processing cycles, processor cores, memory allocation on a processor and/or external to the processor, service bandwidth of software services shared among processes, and/or power consumption, among others.

For purposes of explanation, assume that for a given allocation of resources 106, each of processes 108(1)-108(n) has an associated urgency and an associated latency. Each urgency can be represented by an urgency function. Urgency can be thought of as the importance that a specific process be completed relative to satisfying a facet of the user experience. Stated another way, urgency functions can be derived from looking at the system as a whole and determining how to produce a given quality of user experience. Alternatively or additionally, examples of urgency functions as a facet of the user experience can be "what is the frame rate and associated work per frame for the streaming audio application X" or "what is the response time and associated work to update the screen after the mouse-click event Y".

Latency functions can be derived from measurements or estimations of individual entities, such as applications (i.e., what is the latency of the process for a given amount of resources). Alternatively or additionally, latency functions can represent any function of resource allocation, not only latency. For example if variance in response is a function of the available resources, then a latency function could be derived from minimizing the variance to provide the better user experience that comes from more consistent responsiveness—not just more responsiveness.

For the finite resources 106, the urgency-based resource management tool 110 can determine whether reallocation of the resources among the individual processes 108(1), 108(2), 108(3), 108(n) can decrease overall urgency. The overall urgency can be thought of as the total of the individual urgencies of the system. A decreased overall urgency can enhance the user experience. (It is worth noting that in some instances the system improvements produced by urgency-based resource management may not be perceptible by the user. In other instances, the user may notice significant system improvement).

This urgency-based resource management process is discussed in detail below, but briefly consider a situation in which process 108(1) has a low urgency and a low latency and process 108(2) has a high urgency and a high latency. Reallocating some of the resources from process 108(1) to process 108(2) may only slightly increase the latency of process 108(1) while still satisfying process 108(1)'s urgency. Those reallocated resources may significantly decrease the latency of process 108(2) and thereby lower process 108(2)'s urgency. Accordingly, the urgency-based resource reallocation can decrease overall urgency and enhance the user experience (i.e., user-satisfaction). These concepts are described quantitatively below relative to FIGS. 4-5.

It is worth noting that at least in some implementations, the resources described herein are physical resources rather than logical resources. For instance, some implementations can allocate processor cores or processor cycles rather than processor threads. Such a configuration can eliminate a level of abstraction relating to the resources and as a result can be more performant when allocating the resources.

Other implementations can allocate logical resources. Still other implementations can allocate both physical and logical resources utilizing urgency-based resource management. From a functional perspective, potential benefits of urgency-based resource management can be increased (and potentially maximized) by applying urgency-based resource management throughout a resource allocation process. For instance, performance may suffer where initial resource allocation is handled utilizing urgency-based resource management, but then handed off to an intervening mechanism (e.g. one that maps the thread resource onto the cores) that utilizes a different resource allocation technique.

Figure 2:
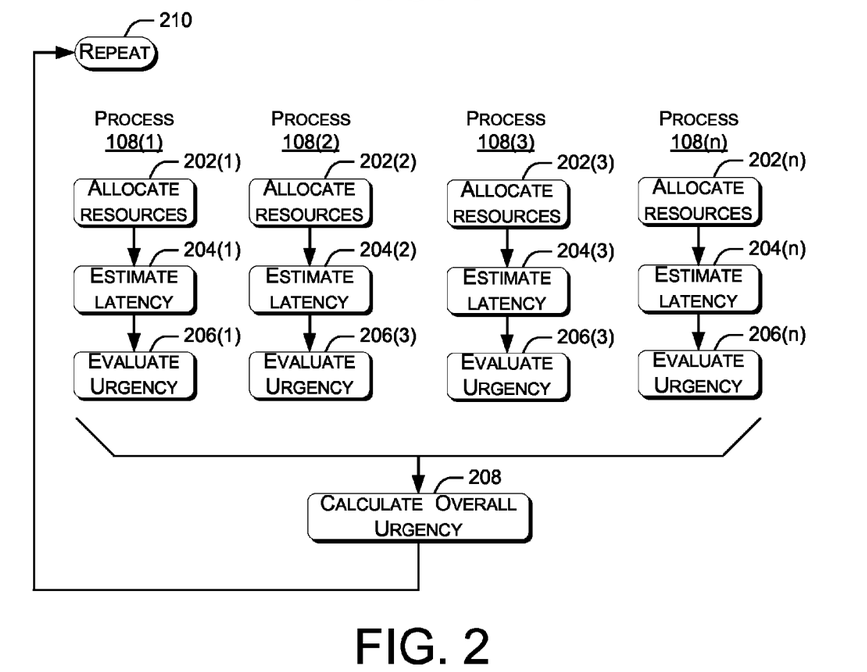
FIGS. 2 and 3 show urgency-based resource management methods in accordance with some implementations of the concepts.

For purposes of explanation, consider FIG. 2 in combination with FIG. 1. FIG. 2 shows a set of techniques that can be performed on each of processes 108(1)-108(n) to objectively reduce overall urgency of system 100. In this case, some of resources 106 are allocated to individual processes 108(1)-108(n) as indicated at 202(1)-202(n) respectively. Given the allocated resources, latency is estimated for the individual processes at 204(1)-204(n). The urgency of the respective processes can be evaluated as a function of the estimated latency at 206(1)-206(n). Overall system urgency can be calculated at 208 from the evaluated urgencies of the individual processes 108(1)-108(n).

The technique can then be repeated as indicated at 210 by adjusting the resources allocated (i.e., re-allocating) to the individual processes 108(1)-108(n). This technique can be repeated until overall urgency calculated at 208 is reduced and potentially minimized. While not shown for sake of brevity, system workload changes, such as process creation and termination, may be incorporated into the technique between cycles. Considering workload changes can be particularly germane where processes represent work entering/leaving the system. Alternatively or additionally, on client systems, changing what the user is focused on may introduce new urgency functions for existing processes.

One potential advantage of the above mentioned approach is that often latency is more sensitive to one particular resource than others. This approach automatically brings the use of resources into balance so that a process is not allocated resources that have only limited affect on latency. Thus, these resources can instead be allocated to processes that are more sensitive (i.e. can make better use of them).

The above mentioned concepts are expanded in the discussion below. However, to summarize at this point, each individual process can have an urgency. The total of the urgencies of the runnable processes can be termed total or overall urgency. The present implementations can attempt to reduce overall urgency. From one perspective, in an instance where the overall urgency is reduced as much as possible, the overall urgency can be thought of as being minimized.

The present implementations can determine the urgency of an individual process utilizing a function rather than a single value. The argument of each urgency function, i.e., its latency, can be an appropriate measure of the responsiveness of the process. In one example relating to a compute-intensive process, the latency might be microseconds per million instructions. In another example relating to an I/O-intensive process, the latency might be microseconds per megabyte of I/O or network data. In still another example relating to a quality-of-service (QOS)-constrained process, latency may be considered as time per unit of useful work. Useful work can be measured in terms of transactions, operations, requests handled, etc. Accordingly, the latency of an individual process can be measured or predicted from its history of resource usage.

Consider further that in some implementations, micro-management of resources within a process is generally application dependent and can be under the control of components of the runtime environment. For instance, in the case of processor cores, the controlling component can be a user-mode work scheduler. In another instance relating to memory pages, the controlling component can be a memory garbage collector.

Figure 3:
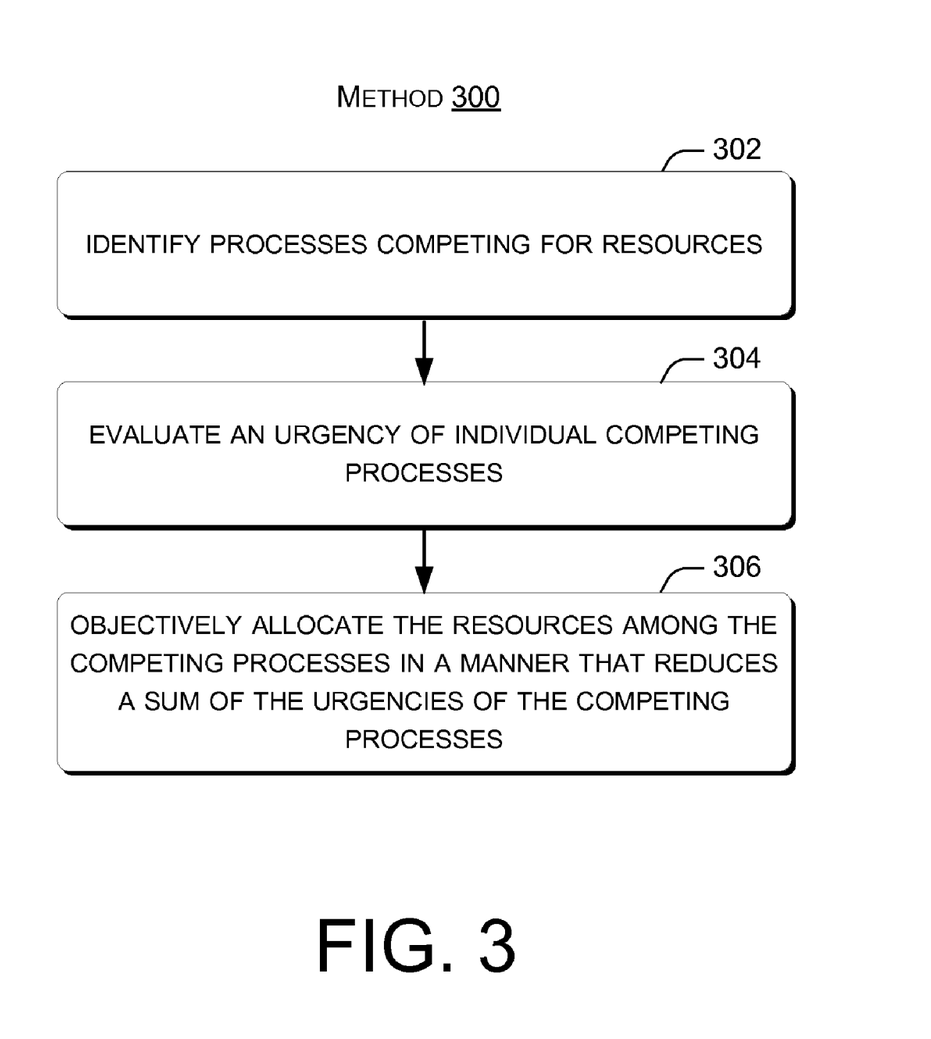

FIG. 3 offers another introductory urgency-based resource management method 300.

At block 302, processes competing for resources can be identified.

At block 304, an urgency of individual competing processes can be evaluated. In some implementations, an urgency function is assigned to each process.

At block 306, the resources can be objectively allocated among the competing processes in a manner that reduces a sum of the urgencies of the competing processes. More specifically, some of the implementations handle the resource allocation as a convex optimization of the sum of the urgencies. The urgency functions and the convex optimization can provide an objective basis for the resource allocation rather than utilizing a subjective or ad hoc approach. Further, the objective basis need not employ heuristics to 'learn' a system. Instead, the resource allocation based upon convex optimization of a system's utility functions can be applied to any type of system. For instance, the system can be an individual computing device or a set of computing devices. Further, the convex optimization of a system's utility functions can be applied where the system includes an operating system or where the system does not employ an operating system.

In summary, urgency-based resource management tools are described to allow efficient allocation of resources to processes to contribute to the user experience, such as by guaranteeing specific responsiveness and quality-of-service requirements. Mathematical examples relating to employing convex optimization to urgency-based resource management are described below.

Mathematical Examples

A succinct mathematical characterization of one urgency-based resource management scheme that can be utilized in some implementations is the following:

Minimize $U = \Sigma_{p \epsilon} P U_p(L_p(a_{p,1} \ldots a_{p,n}))$

Subject to: $\Sigma_p \epsilon P\ a_{p,r} \leq A_r$, $r=1, \ldots, n$ $a_{p,r} \geq 0$ In the above formula, "$U_p$" is the urgency function for process "p". "$L_p$" is the latency function for process "p". "$A_r$" is the total amount of resource "r" available for process "p". Finally, "$a_{p,r}$" is the allocation of resource "r" to process "p". In other words, the urgency of a process is a function of the latency of process which is in turn a function of the resource allocation to the process.

Resource Management as Convex Optimization

In a scenario where the urgency functions, latency functions, and resource constraints are arbitrary, little could be done to satisfy, much less optimize, the total urgency beyond searching at random for the best allocation. However, when resource management is framed as a convex optimization problem, several potential benefits accrue:

1. An optimal solution will exist and be unique;
2. There will be no local extrema;
3. Fast solutions will become feasible.

Consider that a constrained optimization problem will be convex if both the urgency function to be minimized and the constraint functions that define its feasible points are convex functions. A function F is convex if its domain is a convex set and $F(\theta x + (1-\theta)y) \leq \theta F(x) + (1-\theta)F(y)$ for all $\theta$ between 0 and 1. A set is convex if for any two points x and y in the set, the point $\theta x + (1-\theta)y$ is also in the set for all $\theta$ between 0 and 1. When F is differentiable, F will be convex if its domain is an open convex set and $F(y) \geq F(x) + \nabla F^T(y-x)$, where $\nabla F$ is the gradient of F. Put another way, F is convex if its first-order Taylor approximations are always global underestimates.

Accordingly, in some implementations, a convex optimization problem is therefore one that can be expressed as:

Minimize $F_0(x_1, x_2, \ldots x_m)$

Subject to $F_i(x_1, x_2, \ldots x_m) \geq 0$, $i=1, \ldots k$

Where the functions $F_0, F_1, \ldots F_k$: $R^m \rightarrow R$ are convex.

A few more facts about convex functions can be considered in the discussion that follows. First, a concave function is one whose negative is convex. Equivalently, F will be concave if its domain is a convex set and $F(\theta x + (1-\theta)y) \geq \theta F(x) + (1-\theta)F(y)$ for all $\theta$ between 0 and 1. Clearly, maximization of a concave function is equivalent to minimization of its convex negative. An affine function, one whose graph is a straight line in two dimensions or a hyperplane in n dimensions, is both convex and concave. A non-negative weighted sum or pointwise maximum (minimum) of convex (concave) functions is convex (concave), as is either kind of function composed with an affine function. The composition of a convex non-decreasing (concave non-increasing) scalar function with a convex function remains convex (concave).

As a consequence, the urgency-based resource management problem posed above can be viewed as a convex optimization problem in the m=|P|·n variables $a_{p,r}$ as long as the urgency functions $U_p$ are convex non-decreasing and the latency functions $L_p$ are convex. Note that the resource constraints are all affine and can be rewritten as $\Sigma_{p \epsilon P}\ a_{p,r} - A_r \leq 0$, $r=1, \ldots, n$, and $-a_{p,r} \leq 0$. The discussion below establishes the extent to which the stipulated properties can hold for realistic urgency and latency functions.

Urgency Functions

Urgency functions are generically defined as members of a family of such functions so that user preferences for a process p (an implicit parameter elided in the discussion below) can be implemented by assigning values to a few well-understood parameters. As a process grows or diminishes in importance, its urgency function can be parametrically modified to effect the change. In a client operating system, the instantaneous management of urgency function modifications should be highly automated by the system to avoid unduly burdening the user. For instance, user behavior can be observed rather than requiring the user to specify what is important to them.

Figure 4:
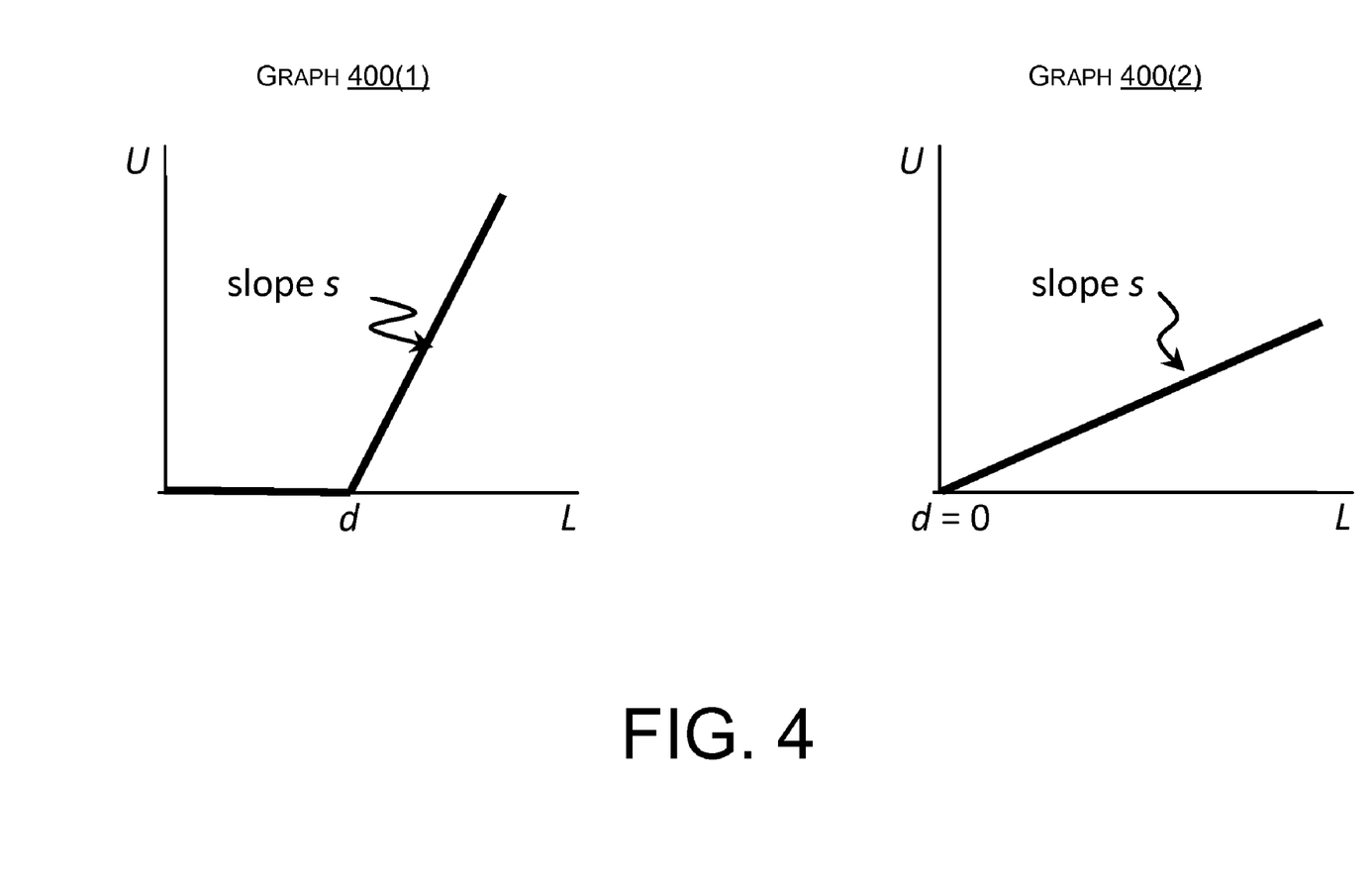
FIGS. 4 and 5 show graphs related to urgency-based resource management systems in accordance with some implementations of the concepts.

Some implementations can employ an urgency function that defines a family of piecewise linear functions of the form $U(L) = \max(s \cdot (L-d), 0)$. For instance, FIG. 4 shows two representative graphs 400(1) and 400(2).

In graphs 400(1) and 400(2), two parameters d and s define the urgency function. To guarantee U is convex and non-decreasing, s must be non-negative. L is of course non-negative, and in some implementations it may be sensible (if not strictly necessary) to convene that d is also. A service-constrained process has a marked change in slope, namely from 0 to s, at the point L=d. Briefly, in graph 400(1), d is a potentially interesting point on the graph. Assume that d corresponds to a QoS metric. If d is not met then the user is unsatisfied. However, exceeding d does not offer substantially increased user satisfaction. Thus, in some implementations, the function associated with urgency can have two aspects of interest: when does the value become greater than zero; and what is the slope after that point.

In the most extreme case $s=\infty$ (implying infinite urgency for the system as a whole when L>d). "Softer" requirements will likely be the rule. For processes without service constraints, some implementations can set d=0 so that $U(L) = s \cdot L$. This defines linear behavior with s as the rate urgency increases with latency.

Stated in more detail, the gradient of process urgency with respect to its resource allocations $a_r$ is useful in controlling the optimization process. By the chain rule, $\partial U / \partial a_r = dU/dL \cdot \partial L / \partial a_r$. The first term is well-defined but discontinuous at L=d with dU/dL=if $(L-d) \leq 0$ then 0 else p. The problem of estimating the partial derivatives $\partial L / \partial a_r$ is discussed below.

Latency Functions

Unlike urgency functions, which describe user experience, latency functions measure performance of processes as functions of their resource assignments. Latency will commonly vary with time as a process changes "phase" and makes better or worse use of more resources. In some implementations, to guarantee the urgency function is convex, L must be also, and this is at first glance a plausible requirement akin to the proverbial "Law of Diminishing Returns". An equivalent statement is that incrementally changing the allocated quantity of a resource results in a latency that is never better (i.e. smaller) than one extrapolated by a first-order Taylor extrapolation from the current allocation. In summary, an interesting aspect is how the latency responds to additional resources (i.e., if more resources are allocated does the latency in turn decrease by a corresponding or at least calculable amount).

Besides the value of the latency function, its partial derivatives $\partial L/\partial a_r$, or approximations thereof are useful to estimate the relative latency improvement from each additional resource. A user-level runtime that manages allocation internal to the process is a good source of these data. Additionally, the urgency-based resource manager can allocate a modest amount and measure the change in latency. "Tabu search" can be used, avoiding the revisitation of an allocation that is known to be worse than the current one.

Unfortunately, there are examples of latency versus resource behavior that violate convexity. One such example can occur in memory allocation, where latency "plateaus" may sometimes be seen. An example is described below relative to FIG. 5.

Figure 5:
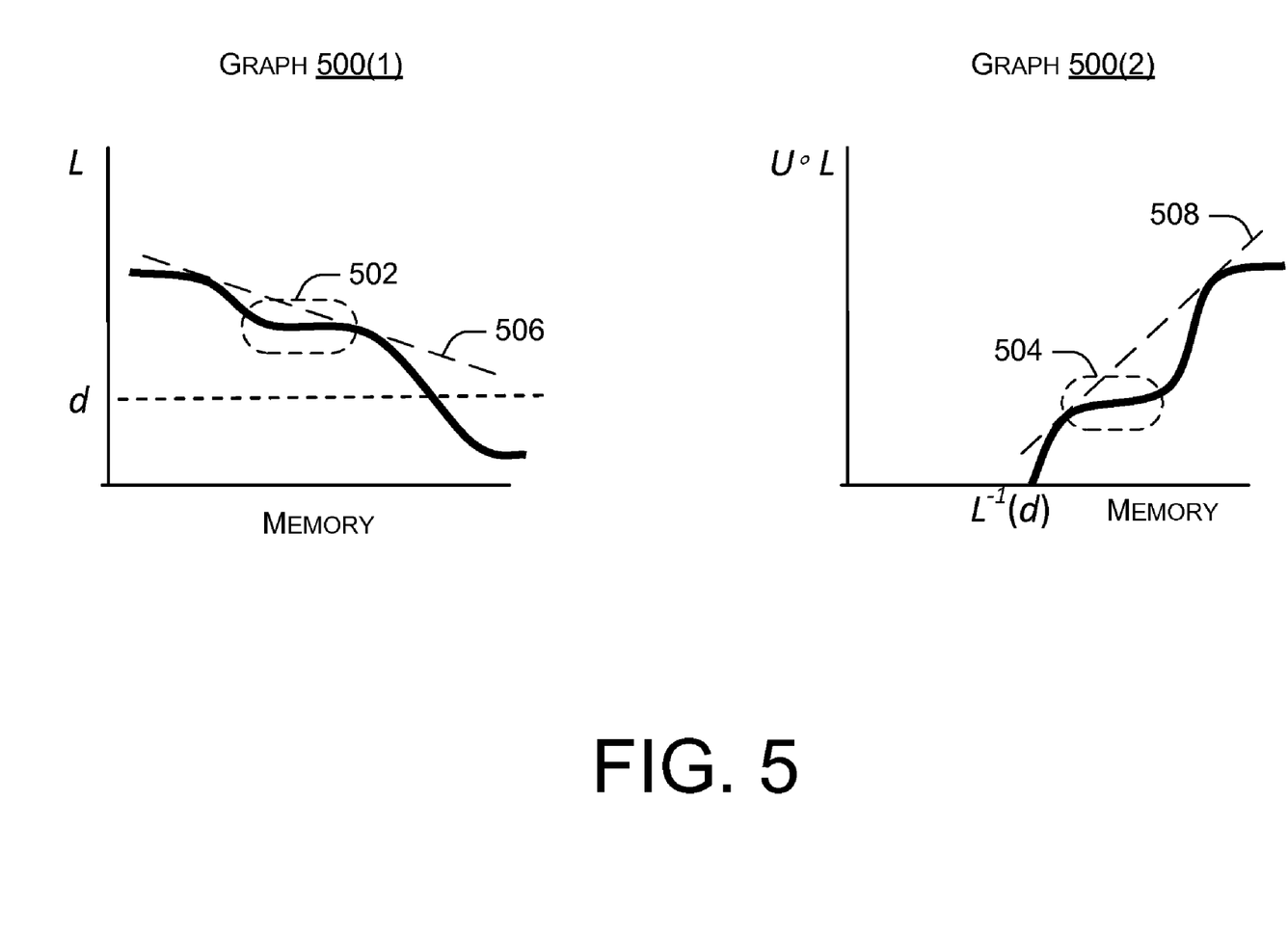

FIG. 5 shows two graphs 500(1) and 500(2). An example of a latency plateau is shown generally in graph 500(1) at 502. In another example, plateau 504 of graph 500(2) shows the effect of latency plateau 502 of graph 500(1) on the urgency.

Typically, these plateaus (such as 502, 504) are caused by major algorithm adaptations within the application to accommodate variable memory availability. The latency is really the minimum of two or more latency functions, one for each range of algorithm applicability, and the minimum function fails to preserve convexity. The effect of the plateaus will be corresponding plateaus of urgency as shown above and multiple solutions to the optimization problem will be the result.

There are a few ways to sidestep this issue. For instance, some implementations can replace the actual latency function by another function that is convex and does not distort the problem too seriously. For the graphs above, a straight line of fixed slope lying above the graph and tangent to it at two points would be conservative and might be reasonable. One such straight line is indicated at 506 in graph 500(1) and another straight line 508 is indicated in graph 500(2). In some implementations, for such a scheme to work for the whole m-dimensional latency surface, the horizontal positions of the inflections between plateaus should not depend on the other resource assignments.

Another possibility employed in some implementations is based on the observation that latency functions will be at least quasiconvex. A function F is quasiconvex if all of its sublevel sets $S_\alpha=\{x|F(x)\leq\alpha\}$ are convex sets. Alternatively, F is quasiconvex if its domain is convex and $F(\theta x+(1-\theta)y)\leq\max(F(x), F(y))$ for all $\theta$ between 0 and 1. Because the sublevel sets are convex, optimization can proceed by replacing the urgency function with a convex constraint function whose sublevel set is $S_\alpha$ and then determining whether there is a feasible solution for that particular threshold $\alpha$. Repeated application with a binary search on $\alpha$ will shrink the size of $S_\alpha$ until it is small enough that the solution is approximated sufficiently well.

A variation on this idea employed in some implementations is to use additional constraints to exclude values for memory resource allocation spanning multiple plateaus. For example, the affine constraint $a_{p,m}-\mu\leq 0$ excludes process p from any assignment of memory resource exceeding $\mu$. Similarly, $\mu-a_{p,m}\leq 0$ excludes the opposite possibility. Yet another variation employed by some implementations is to make the latency function have this effect, e.g. by setting L to $\infty$ outside a desired operating region that only contains a single plateau.

Managing Power and Battery Energy

It can be useful to designate a "process" to receive allocations of all resources that are powered off. In some cases, this would include all resources not allocated elsewhere. Process 0 will play this role in what follows. $L_0$, the measure of latency for process 0, is defined to be the total system power consumption. This function is linear and monotone decreasing in its arguments $a_{0,r}$, i.e. the resources assigned to process 0. The urgency function $U_0$ can now be used to keep total system power below the parameter $d_0$ to the extent the urgencies of other processes cannot overcome it. Alternatively, the slope $s_0$ can be adjusted to reflect the current battery charge state: as the battery depletes, $s_0$ can increase and force processes of insufficient urgency to stop executing.

Very detailed discussion for accomplishing urgency-based resource management with convex optimization is provided above. It is noted here that alternative formulations of the resource management problem can potentially preserve the advantages of convex optimization to achieve the same or similar objectives. For example, the convex non-increasing urgency functions of this formulation can be replaced by concave non-decreasing functions (normally referred to as utility functions), and maximizing their total will still be a convex optimization problem. In another variant, total urgency can be any convexity-preserving operator to combine the urgency functions; using maximum rather than summation will optimize worst-case rather than average urgency. The present resource management concepts cover both expressly described and alternative implementations.

Urgency-Based Resource Management System Examples

Figure 6:
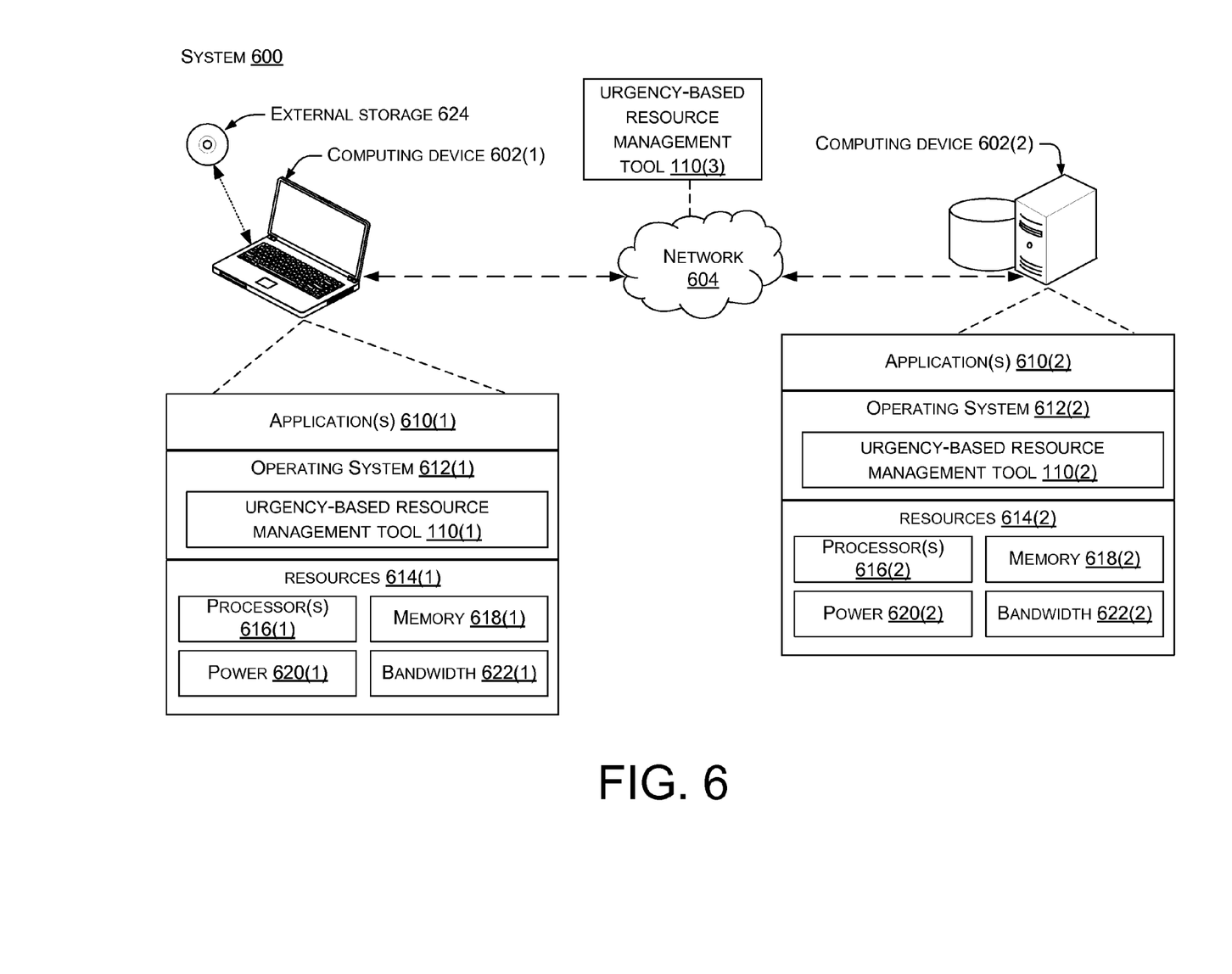

FIG. 6 shows a system 600 that is configured to accomplish urgency-based resource management concepts described above and below. In this case, system 600 includes first and second computing devices 602(1) and 602(2). The computing devices can exchange data over a network 604. Individual computing devices can function in a stand-alone or cooperative manner relative to performing urgency-based resource management.

In this case, each of computing devices 602(1) and 602(2) can include application(s) 610, an operating system 612, and resources 614. In this instance, operating system 612 can employ an urgency-based resource management tool 110. Also, in this example, for purposes of explanation, resources 614 includes processor 616, memory 618, power 620, bandwidth 622, and external storage 624. In this case, bandwidth can relate to shared caches, memory, storage, and/or interconnection networks, among others.

The urgency-based resource management tool 110 can allocate resources 614, such as to application(s) 610 in an urgency-based manner from an overall perspective. Specific aspects of urgency-based resource management are discussed above and below. It is worth noting that the overall perspective may be device-oriented, system-oriented and/or user-oriented. An overall perspective that is user-oriented can consider the user's overall satisfaction with his/her computing experience. An overall perspective that is device-oriented may consider multiple concurrent users.

An overall perspective that is system-oriented may consider processes allocated to different devices. For instance, consider a scenario where application 610(1) running on computing device 602(1) is utilizing resources 614(1), by for instance, receiving data over network 604, processing the data, and presenting the data to the user on computing device 602(1). Simultaneously, application 610(2) running on computing device 602(2) is utilizing resources 614(1) by attempting to obtain data from computing device 602(1), processing the data and sending the processed data back to computing device 602(1) for storage. In such a case, urgency-based resource management tool 110(1) can consider overall system satisfaction rather than just device-oriented satisfaction. The overall perspective or satisfaction may also be goal-oriented, particularly on servers (e.g. in hosting scenarios) where an administrator sets a target (e.g. an SLA) and wants to see as many of the SLAs achieved throughout the system as possible.

Still further, urgency-based resource management tool 110 (3) is intended to represent that the present implementations can be employed for resource allocation in server farms and/or "cloud" computing scenarios. Also, urgency-based resource management tool 110(3) can be utilized within hypervisor-based virtual machines to allocate resources among "guests". Recall further still that while system 600 explains urgency-based resource tools employed with an operating system, these tools can be used in any situation where resources are allocated to competing processes. For instance, these concepts are applicable in a user run-time environment, a hyper visor, a virtual machine monitor, or a distributed system of cooperating computers, among others.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single computing device or over multiple computing devices.

Urgency-Based Resource Management Tool Examples

Figure 7:
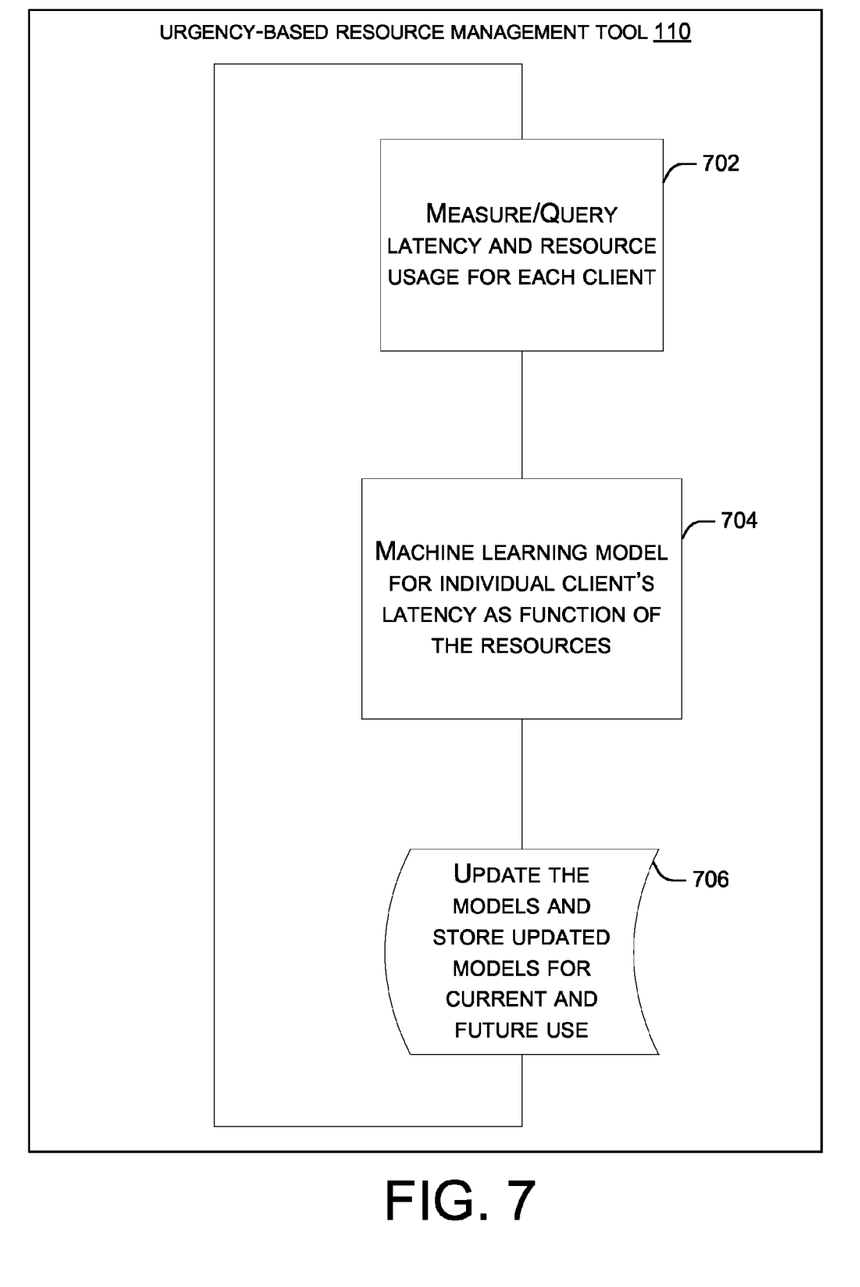
FIG. 7 shows some of the elements of FIG. 6 in more detail in accordance with some implementations of the concepts.

FIG. 7 shows further details regarding one implementation of urgency-based resource management tool 110 from FIG. 6. In this case, the urgency-based resource management tool can be configured to measure or query latency and resource usage for each client of a device or system as indicated at 702.

Further, as indicated at 704, the urgency-based resource management tool 110(1) can be configured to employ a machine learning model for individual client's latency as a function of the resources. Alternatively or additionally, the urgency-based resource management tool can employ Stochastic or Markov learning models.

Urgency-based resource management tool 110(1) can also be configured to update the models and store updated models for current and future use as indicated at 706. The urgency-based resource management tool can schedule resources based upon results produced by the models.

The above described implementations can allocate resources to competing processes in an urgency-based manner that addresses total urgency across the system, maintains resource constraints and/or reacts to changes in workload and/or user desires.

Note also, that the order in which the example methods are described above is not intended to be construed as a limitation, and any number of the described blocks or acts can be combined in any order to implement the methods, or alternate methods. Furthermore, the methods can be implemented in any suitable hardware, software, firmware, or combination thereof such that a computing device can implement the methods and/or cause the methods to be implemented. In one case, a method is stored on a computer-readable storage media as a set of instructions such that execution by a computing device causes the method to be performed.

Conclusion

Although techniques, methods, devices, systems, etc., pertaining to urgency-based resource management are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc. Further, where absolute terms, such as "must" and "best" are utilized in the description relative to specific implementations, it is noted that those absolute terms are not intended to apply to other implementations that are consistent with the present concepts.

The invention claimed is:

1. One or more hardware computer-readable storage media having instructions stored thereon that, when executed by a computing device, cause the computing device to perform acts comprising:
identifying processes competing for resources on a system;
evaluating urgencies or utilities of individual competing processes by:
using a convex or quasiconvex first function to determine one or more first values, and
evaluating the urgencies or the utilities by using the one or more first values determined by the convex or quasiconvex first function as arguments to a second function, the second function being different than the convex or quasiconvex first function; and,
allocating the resources among the competing processes in a manner that reduces a total of the urgencies or increases a total of the utilities of the competing processes,
wherein the allocating is based on convexity or concavity of the second function.

2. The one or more hardware computer-readable storage media of claim 1, wherein the total is one of: a sum of the urgencies, a maximum of the urgencies, or a positively weighted version thereof.

3. The one or more hardware computer-readable storage media of claim 1, wherein the second function comprises one or more convex non-increasing urgency functions.

4. The one or more hardware computer-readable storage media of claim 1, wherein the identifying, evaluating, and allocating are performed in cooperation with an operating system, a user run-time environment, hypervisor, a virtual machine monitor, or a distributed system of cooperating computers.

5. The one or more hardware computer-readable storage media of claim 1, wherein the first function is a latency function, the acts further comprising measuring latency for the individual competing processes to derive the latency function.

6. The one or more hardware computer-readable storage media of claim 1, wherein the identifying, evaluating, and allocating are repeated dynamically in run-time.

7. The one or more hardware computer-readable storage media of claim 1, further comprising detecting workload changes and repeating the identifying, evaluating, and allocating.

8. The one or more hardware computer-readable storage media of claim 1, wherein the identifying competing processes comprises identifying state-pairs running on an operating system, wherein an individual state-pair comprises a first individual competing process and an associated first state.

9. The one or more hardware computer-readable storage media of claim 8, wherein the second function comprises one or more non-increasing concave utility functions that assign utility values to each process-state pair, wherein the one or more non-increasing concave utility functions relate rate of progress and user satisfaction.

10. The one or more hardware computer-readable storage media of claim 9, wherein the allocating resources comprises calculating a total instantaneous utility across the state-pairs via convex optimization of the non-increasing concave utility functions.

11. The one or more hardware computer-readable storage media of claim 1, wherein the convex or quasiconvex first function is a function of resource allocation and the second function is an objective function.

12. One or more hardware computer-readable storage media having instructions stored thereon that when executed by a computing device, cause the computing device to perform acts comprising:
   allocating resources to a plurality of competing processes;
   estimating latencies of the plurality of competing processes using one or more convex or quasiconvex functions to determine the estimated latencies;
   evaluating urgencies or utilities for the plurality of competing processes using the estimated latencies that are determined using the one or more convex or quasiconvex functions; and,
   dynamically reallocating the resources to individual competing processes by applying incremental optimization to the urgencies or the utilities of the individual competing processes to decrease a total of the urgencies or to increase a total of the utilities.

13. The hardware computer-readable storage media of claim 12, wherein the dynamically reallocating further considers workload changes since the allocating.

14. A system, comprising:
   an urgency-based resource management tool configured to:
      estimate latencies for competing client processes using one or more convex or quasiconvex latency functions,
      determine one or more urgencies for the competing client processes using the latencies as an argument to an urgency function, and
      allocate at least one resource among the competing client processes by employing convex optimization, wherein the convex optimization is applied to the one or more urgencies determined using the latencies; and
   one or more processors configured to execute the urgency-based resource management tool.

15. The system of claim 14, wherein the at least one resource comprises multiple resources located on a single computing device or multiple computing devices.

16. The system of claim 14, wherein the at least one resource comprises multiple physical resources and wherein one of the multiple physical resources comprises power.

17. The system of claim 14, wherein the urgency-based resource management tool is further configured to derive the one or more convex or quasiconvex latency functions using latency measurements.

18. The system of claim 14, wherein the urgency-based resource management tool is further configured to employ a machine learning model for estimating the latencies.

19. The system of claim 18, wherein the urgency-based resource management tool is further configured to update the machine learning model and store the updated machine learning model for current and future use.

20. The system of claim 14, wherein the competing client processes relate to a single computing device or wherein the competing client processes include a first client process on a first computing device and a second client process on a second computing device.

* * * * *